UNITED STATES PATENT OFFICE.

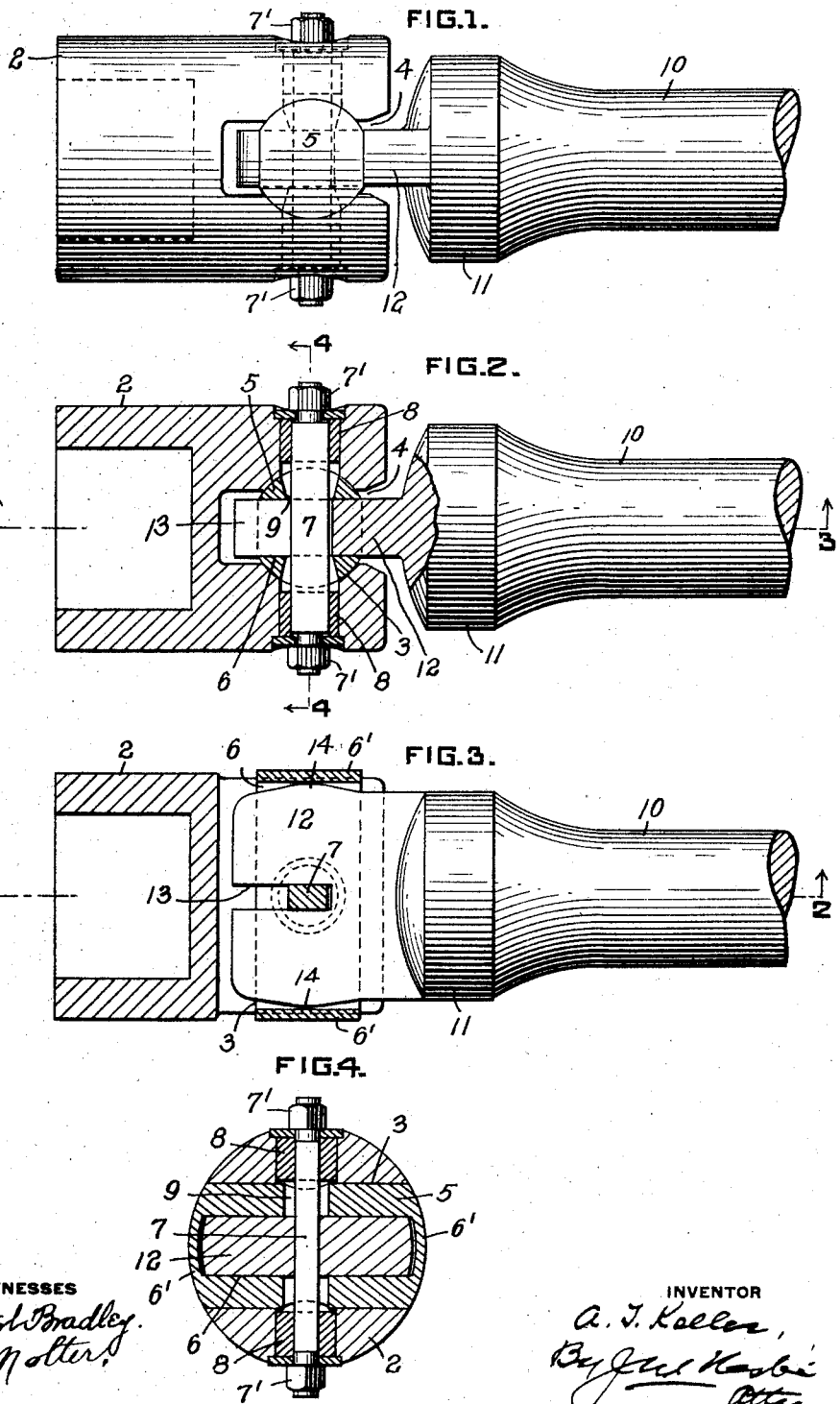

ALBERT T. KELLER, OF BALTIMORE, MARYLAND.

UNIVERSAL COUPLING.

1,300,733. Specification of Letters Patent. Patented Apr. 15, 1919.

Application filed April 3, 1917. Serial No. 159,417.

*To all whom it may concern:*

Be it known that I, ALBERT T. KELLER, a citizen of the United States, and resident of Baltimore, in the county of Baltimore and State of Maryland, have invented certain new and useful Improvements in Universal Couplings, of which the following is a specification.

The object of this invention is to provide a universal coupling for shafts which readily adapts itself to the constantly changing positions of connected rotating parts that are out of line with each other, and which may be quickly and conveniently connected and disconnected. While the invention is designed primarily for use in rolling mills wherein the rolls are adjustable vertically with relation to their driving pinions, the invention may of course be employed wherever a universal coupling for shafts is required.

In the accompanying drawings, Figure 1 is a side elevation of the improved coupling and Fig. 2 is a sectional elevation thereof. Fig. 3 is a sectional elevation taken at right angles to Fig. 2 on line 3—3 thereof. Fig. 4 is a cross section taken on line 4—4 of Fig. 2.

Referring to the drawings, 2 designates the end piece of a rotating part which is here shown in the form of a socket for connecting with such part, although it may be formed integral therewith. If the coupling is used in a rolling mill, part 2 may comprise the end piece of a driving pinion, or of a driven roll, its function being the same in either case. End piece 2 is formed with the transverse bearing cavity 3 which is partially co-incident with slot or cavity 4 extending inwardly from the extremity of said piece. Fitting and rotatable in bearing 3 is the cylindrical journal 5 which is slotted longitudinally at 6. Traversing end piece 2 is rectangular bolt 7 which is secured by nuts 7'. Bushings 8 through which opposite ends of the bolt extend are rotatable in the end piece, whereby the bolt is free to oscillate about its axis at the same time end piece 2 is rotating. Bolt 7 extends through bearing cavity 3 at right angles to the longitudinal axis of the latter, and journal 5 is formed with the through transverse slot 9 for the bolt; said slot being so shaped as to afford the journal limited rotation about its own axis.

The driving spindle 10 is formed with the usual end enlargement 11, and projecting centrally from the latter is the tang-like extension 12 which is entered in slot 4 of end piece 2 and fits the longitudinal slot 6 of cylinder 5. The tang is formed with the inwardly extending rectangular slot 13 which affords it a working fit on rectangular bolt 7, whereby spindle 10 and the bolt are so connected that the rotatable bolt defines the axis of rotation of the spindle relatively to piece 2, or vice-versa. The opposite edges of spindle extension 12 are rounded at 14 for engaging the end walls 6' of journal slot 6, whereby the spindle may turn toward either side with bolt 7 as an axis, or end piece 2 may similarly turn relatively to the spindle.

The movements thus afforded the connected parts accommodate the same to every position in which they may be placed when rotating about axes out of line with each other, and the motion is freely transmitted for every position. While the slotted connection between the spindle and bolt affords the necessary longitudinal play due to the parts rotating in different planes, all of the other movements of the connected parts are about defined axes, with each part accurately and positively confined for such axial movement. To disconnect the end piece and the spindle it is only necessary to fully withdraw one from the other, and by removing bolt 7 the cylindrical journal may be taken out, whereby it is possible to quickly and conveniently assemble or disassemble the parts.

I claim:

1. In a universal coupling, the combination of an end piece formed with a transverse bearing cavity open through an extremity of the piece, a longitudinally slotted cylindrical journal rotatably confined in said cavity, a bolt rotatable in the end piece and disposed at right angles to and extending across said bearing cavity, the journal being slotted transversely for passing the said bolt and for affording the journal limited rotary movement in its bearing cavity, and a spindle having an end portion entered in the end piece and fitting the longitudinal slot of the journal, said end portion being slotted to embrace said bolt, and adapted to oscillate within the journal slot about the axis of said bolt.

2. In a universal coupling, the combination of an end piece formed with a transverse bearing cavity open through an extremity of the piece, a longitudinally slotted cylindrical journal rotatably confined in said cavity, a rectangular bolt rotatably secured in the end piece in position at right angles to and traversing said bearing cavity, and a spindle having a flattened extremity entered in the end piece and fitting the longitudinal slot of the cylindrical journal and adapted to oscillate therein in the plane of said slot, said flattened extremity being formed with a rectangular slot for movably fitting over said bolt.

3. In a universal coupling, an end piece formed with a transverse bearing cavity and an opening thereto through one end of said piece, a journal fitting said cavity and having a through slot, a pin extending through said end piece and said journal at right angles to said slot and a spindle having an end portion entered in said opening extending through said slot and straddling said pin.

In testimony whereof I affix my signature in presence of two witnesses.

ALBERT T. KELLER.

Witnesses:
WM. H. GISIN,
EUGENIE M. KELLER.

Copies of this patent may be obtained for five cents each, by addressing the "Commissioner of Patents, Washington, D. C."